United States Patent [19]

Davister et al.

[11] 4,252,775
[45] Feb. 24, 1981

[54] PROCESS FOR TREATMENT OF RESIDUES FROM FERRIFEROUS ZINC ORES

[75] Inventors: Armand L. Davister, Liege; Wilhem E. Pavonet, Flemalle-Haute; Renaud F. Quatpers, Stockay Saint Georges, all of Belgium

[73] Assignee: Societe de Prayon, Prayon-Foret, Belgium

[21] Appl. No.: 974,324

[22] Filed: Dec. 29, 1978

[30] Foreign Application Priority Data

Dec. 30, 1977 [LU] Luxembourg .......................... 78802

[51] Int. Cl.³ ........................ C01G 9/06; C01G 21/20
[52] U.S. Cl. ..................................... 423/98; 423/109
[58] Field of Search ..................... 423/98, 92, 109, 95, 423/106; 75/101 R

[56] References Cited

U.S. PATENT DOCUMENTS

| 3,434,798 | 3/1969 | Menendez et al. ................. 423/106 |
| 3,652,264 | 3/1972 | Bodson ............................... 423/109 |

Primary Examiner—Wayne A. Langel
Attorney, Agent, or Firm—Weiser, Stapler & Spivak

[57] ABSTRACT

The present invention relates to a process for treating residues from a primary leaching of ferriferous zinc ores by sulphuric acid, with a view to recover a leadbearing by-product, such process comprising a secondary leaching of said residues, by sulphuric acid, within several countercurrent stages, at a temperature comprised between 85° and 100° C., the solid residues of the successive stages being circulated from the first to the last stage, the residue of this last stage being the said lead bearing by-product, whereas the various solutions separated from the second to the last stage are each recycled within the leaching operation of the respectively foregoing stage, and the dual zinc and iron sulphates solution, as separated from the first stage, being the principal product of the treatment.

The primary leaching consists essentially of the chemical attack of the zinc oxide of the ore (naturally oxidized ore or roasted sulphur-based ore) by sulphuric acid and yields, as product, the zinc sulphate solution, which after purification, is used for the electrowinning of the zinc contained, whereas the solid residue from this primary leaching, when ferriferous ores are involved, is subject to the above said secondary leaching, in order to recover separately its zinc as sulphate solution, its iron as a precipitate and its lead as final residue of lead sulphate.

33 Claims, 2 Drawing Figures

PROCESS FOR TREATMENT OF RESIDUES FROM FERRIFEROUS ZINC ORES

The problem of treating, with the best results the iron-bearing (ferriferous) zinc ores has been the subject of extensive research and laboratory, pilot and industrial experimentation which have resulted in extensive literature on the hydrometallurgy of such ores. The following patents may be cited as examples: U.S. Pat. No. 1,362,166 (1920) (Laist); U.S. Pat. No. 1,834,960 (1931) (Mitchell); U.S. Pat. No. 1,973,295 (1934) (Myhren); U.S. Pat. No. 2,754,174 (1956) (Roberts); U.S. Pat. No. 2,772,230 (1956) (Hollander); U.S. Pat. No. 3,143,486 (1964) (Pickering); U.S. Pat. No. 3,493,365 (Pickering) U.S. Pat. No. 3,434,947 (1965) (Steinveit); U.S. Pat. No. 3,652,264 (1969) (Bodson); and U.S. Pat. No. 3,434,798 (1965) (Sitges), and German Auslegeschrift No. 1,295,840, Canadian Pat. Nos. 787,853 and 873,262, Belgian Pat. No. 724,214, and German Auslegeschrifts 1,817,611, 2,156,391 and 1,295,840.

From the above literature, and from other abundant documentation, one may appreciate the general state of the art and specifically the conditions which are considered necessary for the hydrometallurgy of ferriferous zinc ores, examples being as follows:

the leaching has to be made in "closed circuit" with the electrowinning, by using the sulphuric acid regenerated by the latter;

the attack of the ferriferous zinc material has to be made in successive stages within increasingly drastic conditions of acidity, and at moderate temperatures, with a view to first dissolving the zinc and separating its solution, and ending with high acidity and temperature, with a view to then dissolving from the solid residue, the iron with the zinc which has remained linked thereto in the "zinc ferrites";

the attack of the ferrites occurs at acidities between 50 and 300 or 350 g/l of $H_2SO_4$, mostly at high temperatures of 80° to 100° C., at atmospheric pressure, or more; a higher temperature requiring a lower acidity and a shorter reaction time;

the attack at very high temperatures, in an autoclave, at 120°-240° C., is very efficient but is not economically applicable industrially;

although discontinuous processes have still been used quite recently, the economic conditions usually require continuous operation for the plants to be feasible;

in order to attack substantially all of the zinc ferrites, it is necessary to end the attack stages at high temperature and acidities, preferably using an acid with 200-330 g/l $H_2SO_4$, which leaves a final solution in the presence of the final residue, still having 180-200 g/l of $H_2SO_4$ acidity, the residue being substantially lead sulphate with insoluble gangue and some other insoluble sulphates;

as the economic conditions dictate the use of only a small and predetermined quantity of fresh sulphuric acid, the multistage countercurrent treatment which has been recently used has become a requirement;

all of the iron dissolved is substantially collected with in an acidic sulphate solution, wherefrom iron is precipitated, the remaining zinc bearing sulphate solution, very low in iron content being recycled ahead in the leaching process where the acidity and the iron content of the solution are the lowest;

within the same stage, outcoming final solution is separated, after substantially complete neutralization, which practically eliminates all of the iron from the solution, together with the arsenic, antimony, germanium and the like.

From Table 1 of the present specification wherein are displayed the results obtained by the processes of the above mentioned patents, it is seen that the so-called final lead-bearing residue still remains heavily contaminated with zinc, iron, and still other elements which heavily impair its economic value, as compared with purer lead sulphate.

None of the known industrial, pilot plant or laboratory processes has brought a truly satisfactory solution to this essential problem of the hydrometallurgy of iron-bearing zinc ores, in spite of the numerous attempts in accordance with the well-known principles which should bring the best results.

A high quality of lead sulphate residue is that of the U.S. Pat. No. 3,434,798 (Menendez et al) where a laboratory test is disclosed having left a final residue with 24% Pb, 1.15% Zn and 3% Fe, as a result of a single stage secondary leaching made batchwise for 2 hours at 90°-95° C. with an initial acidity of 300 g/l $H_2SO_4$ and a final acidity of 200 g/l, the starting residue having been dry, and a large excess of concentrated sulphuric acid diluted to 300 g/l $H_2SO_4$ having been used. It can be deduced that 1,500 Kg of $H_2SO_4$ per metric ton of residue would be used, of which 645 Kg is fresh concentrated acid, the balance being the so-called spent acid, which has been regenerated by the electrowinning of the zinc.

It must be stressed that the quantity of fresh sulphuric acid which must be injected into the closed circuit of the zinc hydro-electrometallurgy has, in recently made plants, become rather small. Said closed circuit comprises the primary and secondary leaching, the precipitation of iron from the secondary leaching solution, the purification steps of the zinc sulphate solution obtained in the primary leaching and the electrowinning of zinc from the purified zinc sulphate solution.

This quantity of allowable fresh sulphuric acid corresponds to the replacement of the $SO_4^=$ radicals included in the various precipitates and losses, less however a still smaller quantity supplied by the soluble sulphates of the roasted ore. From a prior level of 250-500 Kg of $H_2SO_4$ per metric ton of zinc produced, it has now fallen to 150, 125 or even 100 Kg or less. Such a reduced quantity is insufficient for the practice of the various processes cited hereinbefore.

Certificate of Addition 2,113,862 to French Pat. No. 1,447,094, which corresponds to U.S. Pat. No. 3,434,798, indicates a method for reducing the fresh sulfuric acid quantity used by countercurrent secondary leaching, with two stages and possibly three, using also the conditions of U.S. Pat. No. 3,434,798.

It is an object of this invention to produce a final lead bearing residue of satisfactory quality.

Figure 1:
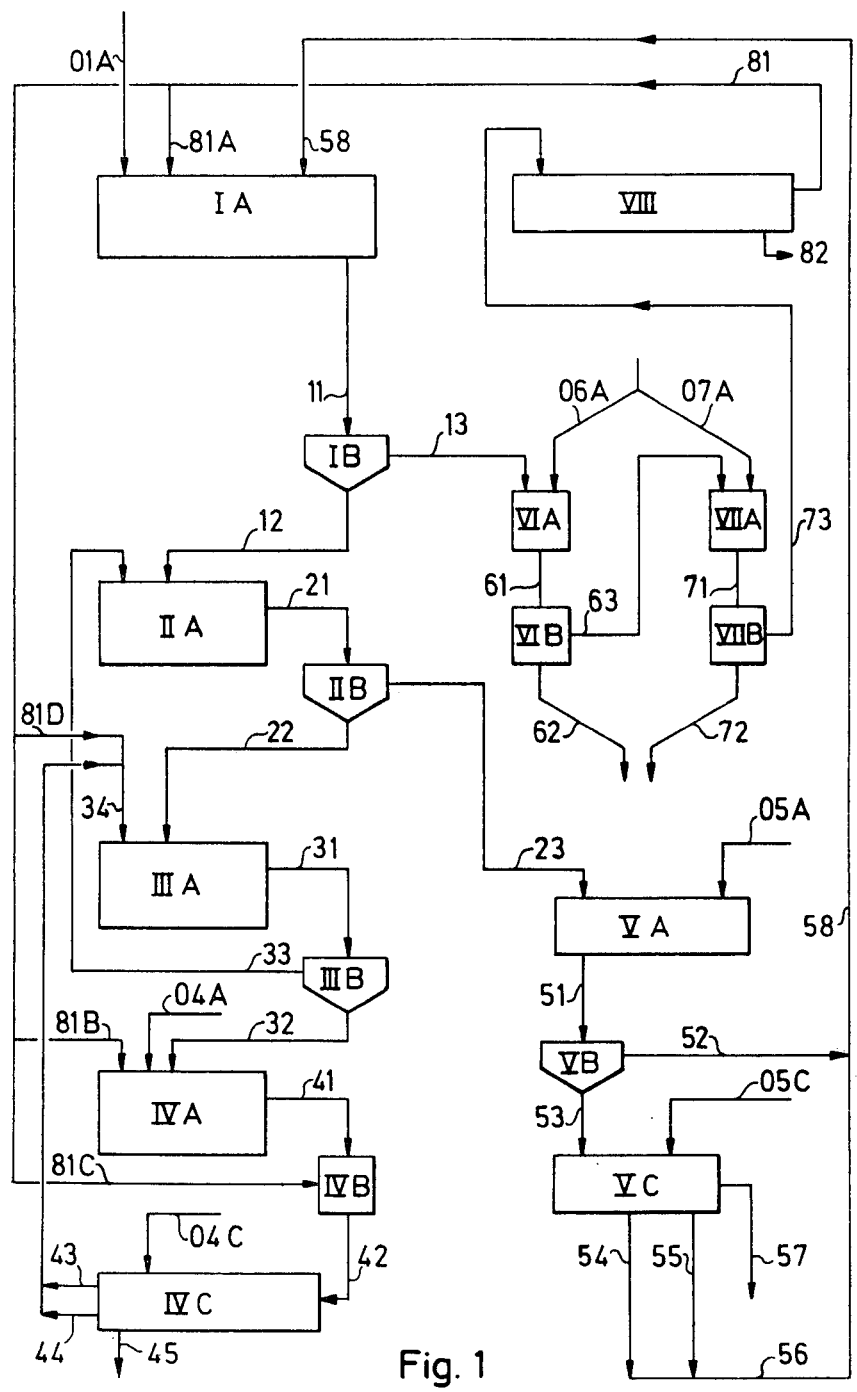
FIG. 1 depicts a typical embodiment and scheme of the process of the invention.
Figure 2:
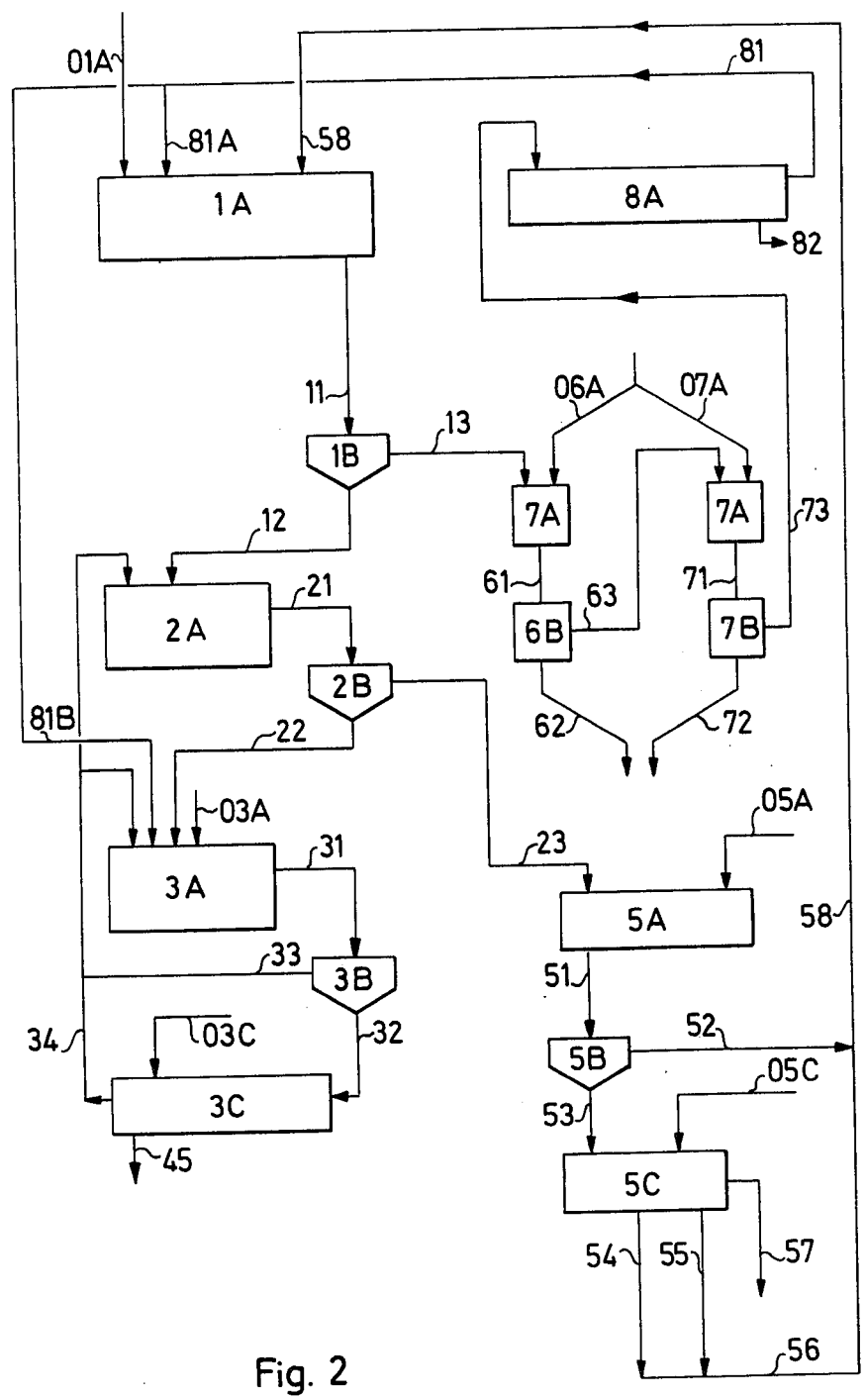
FIG. 2 is a flow sheet of the equipment used in accordance with the invention.

The equipment used was in accordance with the flow sheet of FIG. 2 and comprises two leaching stages as set forth in French Certificate of Addition No. 2,113,862, a settler for separating the solid residue of first stage, and another settler, followed by a filter for the separation of the final residue. Aspects of FIG. 2, such as treatment of overflow 13 will be explained more fully in the discussion of FIG. 1.

The secondary leaching was grafted upon the process comprising a conventional primary leaching in one single "neutral" stage 1 A (reaction finishing neutral with excess of ore in relation with the acid used), connected to the electrowinning of zinc 8 A, the primary leaching being the attack of roasted ore O1 A by a fraction 81 A of the spent acid recycled from the electrowinning there being moreover recycled in 1 A the solutions resulting from the secondary leaching, after precipitation in 5 A of iron in the form of jarosite followed by decantation, filtration and washing of the same in 5 B and 5 C.

The primary leaching residue contained in neutral slurry 11, as resulting from primary reaction 1 A, and tapped from decantation 1 B in the form of a thick slurry 12, was fed into reactor 2 A of first stage of secondary leaching, where it was attacked by solution 33 recycled from second stage.

The new residue as drawn from decantation 2 B of resulting slurry 21, in the form of thickened slurry 22, was again attacked in reactor 3 A of second stage by a fraction 81 B of the spent acid recycled from the electrowinning, and by a portion 03 A of fresh concentrated sulphuric acid.

After decantation in 3 B of resulting slurry 31, the thickened slurry 32 was filtered in 3 C, with waterwash 03 C, the final residue 45 so separated being the lead-bearing by-product, whereas filtrates 34, as well as the clear solution 33 from settler 3 B, were recycled into reactor 2A of the first stage.

Ferriferous solution 23, as separated in a settler 2 B was treated in 5 A for iron precipitation in the form of jarosite, the precipitate being then separated by settling in 5 B, followed by filtration in 5 C, the latter with waterwash 05 C, whereafter jarosite 57 was disposed of into appropriate stores, and liquid 56 of filtrates 54 and 55 were, together with clear solution 52 of settler 5 B recycled to primary leaching through line 58.

In practice, the best operation obtained in continuous operation was defined by the figures of first column of Table 2 the whole being referred to 1000 Kg of primary residue treated, containing 25% of Zn, 20% of Fe, and 5% of Pb.

It is seen that with two stages of secondary leaching, it has not even been possible to approach the results of the test with single attack of U.S. Pat. No. 3,434,798. This is due to the fact that, with two stages, the allowable quantity of fresh sulphuric acid of 150 Kg per metric ton of zinc, does not permit attainment of the attack concentration of 300 g/l $H_2SO_4$, as specified by the patent and the French Certificate of Addition; 2,113,862. This is determined with a solid-liquid separation by settling in line with the normal industrial practice. The addition of a filter for said separation would probably allow the final attack of the 2nd stage to start with the specified acidity of 300 g/l $H_2SO_4$, but it would not be guaranteed that the desired result would be obtained, since there is the compulsory low quantity of fresh concentrated acid to be used. In any case, a filter for such a large quantity of fine solids with low filterability would be too costly, and such a solution to the problem cannot be economically practiced.

As a conclusion, only a secondary leaching with three stages can possibly give an economical and satisfactory solution to the problem, and therefore the industrial experimentation was continued in that way.

A possible solution was to operate the third stage of the secondary leaching discontinuously (batchwise) and to start its attack at 300 g/l $H_2SO_4$ and finish at 180–200 g/l. Experiments accordingly have been made and Table 2 shows two typical results, i.e. with respectively 4 hours and 16 hours of reaction duration. The lead sulphate obtained was absolutely not sufficient in quality, and, further such process and parameters should not be practicable industrially because the reaction slurry obtained, still sufficiently fluid at 95° C., becomes solidified when the matter is cooled to about 80° C., wherefrom it results that the usual solid-liquid separation means cannot be applied. It has been found that this phenomenon is due to the silica which becomes dissolved when substantially thorough dissolution of the ferrites is practiced by the high acidity at 90°–95° C.

In parallel with this experimentation, the process of U.S. Pat. No. 3,434,798 was performed on the same primary residue, the attack being kept active for 16 hours. As will be seen from Table 2, fifth column, the results of the latter were not at all satisfactory. This must be considered as a teaching that the results disclosed in the Patent cannot be reproduced with all ores.

Other experimentation, both industrial and in laboratory conditions, using the low final acidity as specified for first stage of the French Certificate of Addition, have led to the results of fourth column of Table 2, and have shown the reasons of the bad results obtained and in spite of the fact that the good attack conditions as found successful were applied in the later stages, the low acidity produced an unforeseen and important precipitation of jarosite in said first stage (this in the settler thereof, and even in the reactors). The iron which was dissolved by the high acidity of the last stages was precipitated again, some sulphuric acid being then disengaged, which reprecipitated jarosite is thereafter very hard to be dissolved again, even within the drastic attacking conditions of the last stage: therefore, the bad results.

In Table 3, results are apparent which are the proof of such iron precipitation, when the acidity gets down to 25-15 g/l $H_2SO_4$ or lower.

Tests in parallel have also shown that good results can be obtained with only two stages, in a discontinuous manner, with batchwise attack, the last stage being performed according to the attacking conditions of the last stage of the present invention whereas the first stage must be performed at a relatively high acidity, e.g. after 2–4 hours of reaction with a starting acidity of about 150 g/l $H_2SO_4$, and a final acidity of about 70 g/l, the residue of the first stage as shown in first column of Table 3, is then convenient for being treated successfully in accordance with the last stage of the present invention, without any further intermediate stage.

However, this procedure cannot be adapted for an industrial practice of the present time, as continuous operation has now become economically compulsory, and any reasonable arrangement of continuous equipment cannot approach such results of the discontinuous reaction. Moreover, the high final acidity at this stage cannot be accepted, because such acidity would have to be neutralized at the iron precipitation step by a large amount of roasted ore, preferably of special quality, this resulting in an important loss of zinc in the iron bearing precipitate.

Thus, after industrial experimentation had shown that a secondary leaching in two stages was positively inadequate, a solution has finally been found by use of the present invention.

The present invention has for its essential goal a secondary leaching, in accordance with a well defined pattern including precise pecularities of operation, from which a substantially improved lead-bearing by-product is obtained, and this while adding make-up fresh sulphuric acid at a low rate in the whole hydrometallurgical circuit, in accordance with that required by the most recent practices wherein the losses and eliminations of $SO_4^=$ radicals have been drastically reduced.

The invention is an industrial hydrometallurgical process for treatment of zinc ores with medium or high iron contamination, of which the final by-product residue, very rich in lead, contains moreover the "noble" metals of the ore, such as gold and silver which gives the by-product an increased value, while also containing only a small amount of zinc and iron which substantially decrease its value. Additionally, a substantial amount of gangue, chiefly silica and lime, has also been eliminated. In connection with this result, the zinc loss in the residue has been nearly eliminated.

In view of obtaining those results, according to the invention, after a primary leaching of the ore, generally in one single stage, following a conventional pattern of operation, a secondary leaching is practiced, preferably in a continuous manner, with at least three successive countercurrent stages, of which at least the last one is fed with a large excess of sulphuric acid in relation with the amounts of soluble metals contained in the reaction mass. Additionally, at all stages substantially steady acidities are maintained, such acidities becoming higher from any stage to the following one, the acidity of the first stage remaining higher than that which starts precipitating jarosite, the acidity of the last stage being kept below that which produces a mass gelification at the final cooling, the reaction time of the last stage being at least of 6 hours, at the end of which the separated solid residue is the sought for lead-bearing by-product.

It has been found that an acidity over about 250 to 300 g/l of $H_2SO_4$ combined with a solid content in the slurry of 125 to 175 g/l produces said gelification, when the silica content of the ore varies respectively from about 6 to 1% $SiO_2$, i.e. about 40 to 10 g/l of $SiO_2$ in the reacting mass of the last stage, the zinc and iron content in the solution having moreover to be maintained each below a limit of about 70 g/l. High contents of zinc and iron hinder a thorough attack of the zinc ferrites and tend to cooperate to the gelification process. The whole of the fresh sulphuric acid to be used is introduced within the last stage, and the desired acidity is maintained therein by the diluting addition of spent acid from the electrowinning, the quantity of which is adjusted to keep such desired acidity.

It has further been found that the attack of zinc ferrites still continues to progress when the high acidity and temperature of the last stage are maintained well over the 2 to 6 hours duration conventionally practiced. A long duration, over 12 hours and preferably reacting and exceeding 18 hours, is one of the essential factors for obtaining the desired quality of the final by-product. Such an unconventional final attack includes a partial solubilization of silica and lime, which were conventionally reputed to be insoluble within the average conditions of the invention, e.g. 40 to 50% of silica and lime are dissolved. In view of this, filtration of the final slurry is difficult because of precipitation which clogs the filter cloth and even some gelification which may be significant. The filtration difficulties are avoided if the slurry is diluted and cooled to about 60° C. prior to being filtered, which operation is advantageously obtained by mixing with the slurry a fraction of the spent acid from the zinc electrowinning.

As to the first stage, the above mentioned parasital precipitation of jarosite starts at about 30 g/l $H_2SO_4$, for an iron content of about 35 g/l in the solution, and at about 10 g/l $H_2SO_4$ for a lower iron content of about 10 g/l. Accordingly, the working acidity of the first stage is chosen somewhat higher that those limits, i.e. about 40–50 or 30–40 g/l. From the choice of this working acidity ensues the quantity of spent acid from the zinc electrowinning which has to be introduced in the second stage, consideration having of course been given to the acid quantities fed into the last stages and the acid still remaining in the final solution of this last stage which is recycled to the previous one.

Within such conditions, the various volumes of reaction having been settled, the acidity of the second stage in the continuous operation is automatically stabilized.

The acidity at any point in the first stage must be monitored so that it does not fall lower than 5 g/l higher than the acidity which starts precipitating jarosite, as disclosed hereinbefore, and therefore, the iron content of the solution is checked accordingly.

In the third stage, the silica content is checked, and the acidity is preferably maintained as steady as possible at 10 to 15 g/l below that figure which results in gelification.

As already stressed, continuous operation is preferred because modern economic conditions make it unavoidable. Therefore, each of the leaching steps will have to comprise at least two reactors in series with good agitation, with a view to reducing the loss of efficiency brought about by the continuity of reactant feed and of product removal within a mixed slurry which has residue particles having remained only a short time in the reaction mass. It has been found that two reactors in series are a good choice for the stages other than the first one, as additional reactors do not bring an additional profit in line with the investment involved. For the first stage however, as the zinc and iron content of the incoming residue is still rather very high, it is preferred to use three reactors in series. The whole of the reactants are introduced in the first reactor of any stage, wherein most of the reaction is obtained, whereas the escape of poorly reacted particles is avoided by the presence of the subsequent reactors.

In this way, within the steady continuous operation, there occurs in each of the reactors a substantially steady acidity, with a small acidity drop from one reactor to the following one of the same stage, which is 5 to 10 g/l $H_2SO_4$ within normal operation conditions. From the last reactor to the settler, the acidity fall is also generally of 10 to 15 g/l $H_2SO_4$.

The continuous operation with substantially constant acidity at any given point of the process essentially differs from the general practice of attacking batchwise discontinuously with a high initial excess of acid, the reaction being then left to progress until a very reduced residual acidity is obtained.

As the results obtained with three countercurrent stages in accordance with the invention have been found quite satisfactory; generally any further stage although not excluded is not necessary. As illustration iron-bearing materials containing about 56 to 62% Zn, about 8–12% Fe, 1.5–4% Pb and about 0.5–3% $SiO_2$ have been so tested satisfactorily.

The solid-liquid separations which have to be made at the end of each stage are also very important for obtaining good results. Separations by filtration are economically excluded when the residues are voluminous and of relatively bad filterability as they are in the first two stages. Therefore, separation by decantation (settling) is unavoidable. It will thus be important to properly maintain a smooth and regular operation of the settlers. Known settling-aids may be used in such a way as to draw off, from the settler bottoms, thickened slurries with at least about 350 g/l of solid content for the residues fed into first and second stages, and about 250 g/l for that fed into third stage, with preferred values being respectively about 400 g/l and 275/300 g/l. Lower solid contents, more especially in the feed to third stage, would likely make it impossible to achieve in the last stage the high acidity required for the optimal results sought. Higher solid contents would entail risks with respect to the above-mentioned gelification and a slowing down of reaction rates, much higher solid contents being moreover mostly unobtainable in practice.

For the fresh sulfuric acid makeup introduced in the third stage, an acid with about 96–98% $H_2SO_4$ concentration will be preferred in order to get the desired acidity level in the acidic solution mixed with the solid residue at that reaction stage.

The final solid residue of the third stage is drastically lowered in weight and in volume and is freed from an important fraction of silica which the original primary residue contained. This final residue will be separated from its associated solution by filtration with washing since its filterability is much higher than that of the residues of the previous stages. This separation will be made preferably on a filter-press of a rather small size, after the dilution and cooling of the slurry which have been previously described. A thorough washing of the cake should be maintained by about 2 $m^3$ of water for each metric ton of final residue in order to remove from the cake as much impregnating solution and solubilized silica as at all possible.

From what has been disclosed above it is apparent that in accordance with the preferred embodiment of the invention, there are three reaction stages and the operation is continuous and countercurrent. Further, substantially constant acidities are maintained within each of the successive reactors, these acidities being progressively increased from the first up to the last stage, respectively, between 30 and 50 g/l in the first stage, between 120 and 150 g/l in the second one, and between 200 and 300 g/l of $H_2SO_4$ in the third and last one. It should be noted that the actual lower acidity limit in the first stage, and the actual higher acidity limit in the last stage should be selected with consideration to the iron and silica contents, as has been disclosed herein before.

Within such conditions of the secondary leaching, a primary leaching residue which contains about 45 percent of zinc and iron and about 5 percent of lead will lose in each of the three stages about half of the weight it had at the entrance of the respective stage, leaving the process as final residue with a weight of at most about one-eighth of the initial weight of the starting primary residue.

Other details and peculiarities of the invention will be apparent from the description hereinafter given, as a nonlimitative example, of a typical embodiment and scheme of the process of the invention, which is shown in FIG. 1. In FIG. 1 will be seen the various steps and stages of the complete treatment of the roasted zinc ore, starting with the primary leaching, up to zinc electrowinning, through the secondary leaching, iron precipitation and zinc solution purification for electrowinning.

The starting roasted zinc ore contains about 60 percent of zinc, about 10 percent of iron and about 2.5 percent of lead.

The quantity of fresh sulfuric acid used, in line with a very low level of losses and eliminations of $SO_4^=$ radicals from the whole circuit is only about 80 to 125 Kg per metric ton of zinc produced at the electrowinning, i.e. 120 to 200 Kg per metric ton of primary leaching residue treated, or 400 to 1000 Kg per metric ton of iron contained in the ore, this being in accordance with the usual variations in the ore composition.

The lead-bearing by-product obtained contains at least about 40–45 percent of lead, essentially in the form of $PbSO_4$, the sum of the zinc and iron content being at the most about one-tenth of the lead content, whereas the remaining quantities of $CaO$ and $SiO_2$ are only 50–60 percent of the quantities contained in the starting roasted ore.

Within the primary leaching of the roasted ore, which comprises one single "neutral" step (i.e. ending neutral with an excess of reagent roasted ore) said ore 01A is attacked in a group IA of reactors by a fraction 81A of the so-called spent sulfuric acid recovered at the electrowinning, then also by the acidic solutions as recycled from the decantation (settling) VB and from the filtration VC of the precipitated jarosite, i.e. respectively decanted solution 52 and filtrates of mother-liquor 54 and washing 55. Lead and noble metals in the ore, and also iron remain undissolved, the latter being predominantly in the form of zinc ferrite.

At the end of reaction in the primary leaching, a certain excess of roasted ore together with an oxidizing agent, such air, oxygen or $MnO_2$, ensure that such portions of iron which could have been dissolved at the beginning of the primary leaching (when the liquid is still acidic) and also that which was contained in the solutions recycled from jarosite decantation and filtration (52, 54, 55) are precipitated.

The neutral slurry 11 resulting from the primary leaching is decanted (settled) in vessel IB. The overflow 13 is a clear solution of zinc sulfate with about 150 g/l of zinc substantially freed from any iron, and is called the "neutral solution". This is then treated with zinc powder 06A and 07A in reactors VIA and VIIA, wherein cadmium, copper, cobalt and other metals which are more electropositive than zinc and reprecipitated.

After precipitates 62 and 72 have been removed from mixtures 61 and 71 in filtration units VIB and VIIB, the purified zinc sulfate solution 73 is submitted in tank VIII to the electrowinning of zinc, which is obtained pure in the form of cathodic deposits, called "cathodes", leaving a spent electrolyte 81 or "spent acid" the zinc content of which has been reduced to about 50 g/l, whereas the acidity has been "regenerated" up to about 180 g/l $H_2SO_4$. Pure zinc cathodes 82 are then melted and cast into ingots or slabs.

The primary leaching, purification of the neutral solution and the electrowinning, so described in a very general way, are performed in accordance with known techniques.

Thickened slurry 12, i.e. the underflow drawn off settler IB, comprises about 400 g/l of solids containing the whole of the iron, lead or other heavy and noble metals of the ore together with its lime, silica, arsenic, antimony, germanium, etc. and still more than 15% of the zinc which was in the ore. It is thus submitted to the secondary leaching in three countercurrent stages during which will be maintained, in the various solutions involved, temperatures between 85° and 100° C., preferably 90° to 95° C., in accordance with the invention.

In the first stage, thickened slurry 12 and solution 33, as recycled from settler IIIB of the second stage of the secondary leaching are mixed within reactor or reactors IIA wherein acidity is maintained preferably between 30 to 50 g/l of $H_2SO_4$. After an average residence time of 3 to 4 hours, about half of the solid residue treated, at least, has been dissolved.

After decantation of mixture 21 in vessel IIB, clear overflow 23, with about 65 g/l of zinc and about 25 g/l of iron is submitted in tank VA with calcine 05A to iron precipitation, substantially in the form of "jarosite". The remaining solution 51 is then separated by decantation vessel VB, followed by filtration of solids 53 in filtration unit VC, the filtered cake obtained being washed by water 05C at a rate of about 1.5 $m^3$ per metric ton of solids. The cake of "jarosite" 57 produced is eliminated, whereas the clear liquor overflow 52 of settler VB and filtrates 56 of mother-liquor 54 and of washing 55 collected from filter VC are recycled into primary leaching IA. Precipitation and separation of jarosite are performed in accordance with known techniques.

Thickened slurry 22, collected as underflow from settler IIB, containing about 400 g/l of solids, then undergoes in reactor or reactors IIIA, attack of the second stage of the secondary leaching over an average period of about 2 to 3 hours. In IIIA, there will be added liquids 43 and 44, which are collected from the filtration and washing of the final residue of third stage, and a fraction 81D of the spent acid from the electrowinning. These additions 34 settle the acidity at 130-150 g/l of $H_2SO_4$ which produces a further dissolution of at least about 50 percent of the solid residue entering the second stage.

After mixture 31 exits IIIA, decantation is performed in IIIB from which is obtained as overflow an acidic liquor 33 which is recycled into reactors IIA of the first stage of the secondary leaching. Also obtained is the thickened slurry or underflow 32 of the second stage with about 275 g/l of solids which undergoes within reactor IVA of the third stage, the strongest attack here practicable. This is accomplished by a solution containing 200-300 g/l, preferably 240-280 g/l of $H_2SO_4$, such solution being obtained by the mixing of slurry 32 with some fresh sulfuric acid 04A and with an adjusted amount of spent acid 81B. The adjusted addition of 81B dilutes the whole resulting slurry in $H_2SO_4$, zinc, $SiO_2$ and in solid matter in such a way as to maintain the content of said components below limits respectively set at 250-300 g/l, 70 g/l, 70 g/l and 125-175 g/l, respectively. Beyond these limits, it has been found that there may occur risks of mass-setting of the whole slurry or gellification with the $H_2SO_4$ acidity limit depending on the quality of silica present.

After an attack of at least about 12-25 hours, the third stage slurry 41 is then, in vessel IVB, diluted and cooled by mixing with a further quantity of spent acid 81C. Thereafter, mixture 42 is filtered in filtration unit IVC, the cake so obtained being washed by water 04C at a rate of about 2$m^3$ per metric ton of final solid residue, i.e. about 0.1-0.2$m^3$ per metric ton of zinc produced. Filtrates 43 and 44 from filtration and washing are then recycled into second stage reactor IIIA of the secondary leaching. The final washed cake 45, the weight of which is at the most about one-eigth of the original primary solid residue fed into first stage IIA is the sought for lead-bearing byproduct, called "lead sulfate" in industrial practice.

For every metric ton of zinc produced, 8-8.5$m^3$ of recyclable spent acid as collected from the electrowinning, almost the half is recycled as flow 81A for the primary leaching. Of the other half, a minor part is used in 81B for the adjusting dilution of the reaction medium of the third-stage reactors of the secondary leaching. The balance constitutes flows 81C and 81D and is used in the secondary leaching, part 81D directly and part 81C by way of dilution-cooling in IVB of the final slurry outflowing from the third stage before filtration IVC.

Table 4 displays typical average results as obtained at the final phase of large scale industrial experimentation in accordance with the scheme of FIG. 1, whereas Table 5 disclosed the various operating parameters thereof.

On Table 6 will be found the various figures by which a comparison will be possible of the results obtained respectively by the process in accordance with the invention on the one side and those obtained by other processes or by other phases of the experimentation.

It will be seen that in each of the three stages of the present process of secondary leaching, the solid residue treated loses about half of its weight at the entrance of the respective stages. Thus, the final residue leaving the third stage has been reduced to about one-eighth of the weight of the starting primary residue fed into the first stage reaction. This important decrease of weight is an essential feature of the process of the invention, since the quantity of the solids within the third stage must be very small whereby the attack may in this stage be made within a small volume of acid and with an acceptable content of solids in the slurry. Such conditions are essential for obtaining in the third stage reaction a high acidity with only a small quantity of fresh concentrated sulfuric acid and also to make possible a long attack duration, e.g. at least about 12 to 25 hours, with a reaction volume still economically bearable.

When comparing the reaction rates of zinc and iron within the successive stages, it can be seen that after a high zinc attack in the primary leaching of about 80 percent, combined with almost no attack at all of iron, the attacks of both zinc and iron are moderate in the first stage of the secondary leaching, e.g. about 55 percent. Then, in the second stage, the zinc attack is markedly higher than that of iron, e.g. about 85 percent against 60 percent. Finally in the third stage, both zinc and iron extractions are high, each about 93 percent. The last figure should be considered as very high because extremely low final residual contents are involved.

On the other hand, when the results obtained are compared to those which can be drawn from prior art literature and with other industrial experimentation of the secondary leaching in 2 and 3 stages, as mentioned herein before and in Table 3, it will be seen that the quality of the so-called "lead sulfate" byproduct has been drastically improved. This is, its lead content is increased from 20 or 25% to 40 or 45%. Further, the (Zn+Fe)/Pb ratio which can be considered as the measure of the purity degree of the lead sulfate produced is lowered clearly below 0.1, whereas prior to the invention, it has not been possible, to go below 0.2 on an industrial scale.

It will be further noticed that in relation to the previous art where a high acidity is used, a spectacular reduction of the quantity of fresh sulfuric acid used has been obtained. In a complete set of hydrometallurgical operations wherein the losses and eliminations of $SO_4^=$ radicals have been drastically reduced, the high fresh sulfuric acid requirements of the prior art techniques would make it compulsory to draw off substantial quantities either of zinc sulfate solution or of spent sulfuric acid from the electrowinning. These drawn off amounts are a counterbalance to the excess feed of fresh sulfuric acid into the hydrometallurgical circuit.

The essential factors for the high lead content and high purity of the lead sulfate byproduct are firstly the long attack by hot concentrated sulfuric acid with the concentration being however kept below a certain limit to avoid mass setting as explained herein before. A second essential factor is the progression of the attack within the three successive stages which results in a reduction of the solid residue fed into the third stage to less than the fourth of the weight of the primary leaching residue. The procession of attack being the condition for the necessary reduction of the quantity of fresh concentrated sulfuric acid which has to be used in the third stage. This allows to get the desired high acidity level within a very reduced reaction volume.

It should further be pointed out that silica and lime, which in prior art conditions of secondary leaching were practically insoluble, are here substantially solubilized in an amount of at least about 40 to 50 percent. This solubilization is due to the particular efficiency of third stage attack, which contributes to the increase of the lead content of the byproduct lead sulfate.

In accordance with the characteristic features of the invention, the whole of the fresh sulfuric acid that is taken up by the overall hydrometallurgical treatment is, by preference, introduced into the third stage of the secondary leaching, wherein it instantaneously heats up the whole reaction mass by its exothermal absorption of water from the solution with which it is admixed. This feature is a favorable factor for the attack of zinc ferrites and silica in that within the reacting mass, "micro-climates" are generated which are more aggressive in their attack and wherein the temperature is higher.

It will be noted that in the far drawn leaching of the residue which is characteristic of the invention attacking acidities within the range of 300-330 g/l of $H_2SO_4$ are not reached, which were considered in the prior art techniques as being the most favorable range for a good attack of the ferrites, it being implied in the far drawn leaching that a substantial part of silica and lime are also dissolved, and that such high acidities generally produce mass-settings of the slurry—which dissolution and mass-setting were not known within prior art techniques, but have been brought to evidence by the conducted experimentation.

It should further be noted that at the end of the reaction, in the third stage, dilution and cooling of the slurry prior to its filtration, as obtained by admixing about 2 volumes of cold spent acid from the electrowinning with 1 volume of slurry enables one to avoid gelification or solidification within the filters.

A last Table No. 4 displays the comparative results of 2 last stage attacking tests:

(a) In accordance with the conventional discontinuous batchwise attack, a determined quantity of acid at the start, such as an initial acidity of 300 g/l of $H_2SO_4$, is reduced to about 200 g/l at the end; and (b) When working with a constant acidity equalling the average between those two figures, i.e. 250 g/l.

The results of second test (b) with constant acidity are much better than those of the first test, wherein the attack has started with a much stronger intensity. The reaction mass of the first test (a), discontinuous and starting at 300 g/l $H_2SO_4$, remains fluid when hot but becomes gellified when cooling down toward about 80° C. whereby any solid-liquid separation of said mass is rendered impossible. By contrast, the mass of the second test at the constant acidity of 250 g/l does not become gellified when cooling and can be submitted to a solid-liquid separation.

Although the preferred embodiment of the invention is basically the continuous attack in three successive countercurrent stages, the particular operating conditions of the last stage can obviously be combined with the first discontinuous batchwise stage of attack which would give a solid residue of sufficiently reduced weight and iron plus zinc contents. The present invention therefore contemplates any such embodiments. In the case of a discontinuous batchwise reaction in the first step, it is indeed sometimes possible to get after about 2 hours a first stage residue which is fit to be further treated directly within the conditions of the last (third) stage of the invention.

In what concerns the sulfuric acid consumption as displayed in the various tables, it should be noted as follows:

Acid consumptions of course vary in practice depending on the forms of zinc and iron compounds in the starting material which may contain some basic sulfates which were insoluble at the end of the primary leaching, and which are solubilized by the secondary leaching. The corresponding quantity of $SO_4^=$ radicals present entails a decrease of the sulfuric acid consumption in the secondary leaching, but the primary leaching has an increase of $H_2SO_4$ consumption equal to the same so that the total sulfuric acid consumption of primary and secondary leaching remains unchanged. In the case of the Tables of the present specification, it has been necessary for the sake of fair and valid comparisons, to consider that the primary leaching residue had an ideal consumption and did not contain any $SO_4^=$ radicals.

As a particular case it is necessary to point out the unusual consumption of the starting material of French Pat. No. 1,447,094 for which the sulfuric acid consumption as deduced from said patent data is only about half of that calculated for the case wherein the whole of the zinc and iron would, in the starting residue treated, completely be in the form of oxides, without any $SO_4^=$ radicals.

On the other hand, it is a matter of course that the fresh sulfuric acid consumption is decreased when the quantity of $SO_4^=$ radicals is increased in the starting material of the primary leaching and by a corresponding quantity.

It is within the contemplation of the invention that the concentration of sulfuric acid and of the solids contents in the various stages of the reaction be maintained by feeding sulfuric acid solutions to the various leaching stages from sources other than shown in the embodiment of FIG. 1. For instance, the sulfuric acid recycled and shown as 43 and 44 from the recovery of the cake product need not be recycled to reaction stage shown as IIIa but can be recycled to the first stage as shown under IIa partially or completely and other modifications can be readily made by one skilled in the art. Likewise, spent acid from the hydrometallurgical reaction need not be fed, as shown in FIG. 1, to reaction stages IIIa, IVa or IVb but it can be fed to one or more of these with equivalent substitutes being made for feeding appropriate amounts and concentration of sulfuric acid to these various stages. Moreover, although the precipitation of the iron as jarosite has been shown after leaching of the first stage, the liquid can also be separated from and after the leaching at the second stage exclusively or in combination with that as shown in FIG. 1.

These and various other permutations and variants are considered within the scope and the spirit of the invention, the invention not being intended to be limited by the specific embodiments disclosed above, which at the present time represents certain optimum conditions which also take into account economic and financial and commercial considerations.

Another factor is to be considered. Since the process is of worldwide applicability with materials of various sources, the nature of the raw materials and in particular, their metal contents may vary from one country to the other. Accordingly, conditions which are viewed in the specification as being perhaps less desirable in one particular country may be considered both practical and of enough business interest for applicability in the United States.

It is with these considerations in mind that the various values and limits are to be regarded in the above specification.

The invention makes an important contribution to the field of recovery of lead sulfate from various intermediate products in the hydrometallurgical industry.

| | PRIOR ART RESULTS (in Metric Tons of Starting Residue) | | | | | | | | | | | | | |
|---|---|---|---|---|---|---|---|---|---|---|---|---|---|---|
| | I | | II | | III | | IV | | V | | VI | | VII | |
| | % | Kg | % | Kg | % | Kg | % | Kg | % | Kg | % | Kg | % | Kg |
| Starting Residue | | | | | | | | | | | | | | |
| Total | 100 | 1000 | 100 | 1000 | 100 | 1000 | 100 | 1000 | 100 | 1000 | 100 | 1000 | 100 | 1000 |
| Zinc | 16.4 | 164 | 20.2 | 202 | 21 | 210 | 20.2 | 202.1 | 26 | 260 | 18 | 180 | 24 | 240 |
| Fe | 29.9 | 299 | 31.8 | 318 | 31.5 | 315 | 28.6 | 286 | 26 | 260 | — | — | 47 | 470 |
| Pb | 5.93 | 59.3 | 5.6 | 56 | 6.5 | 65 | 8.43 | 84.3 | 5 | 50 | — | — | — | — |
| Product Residue | | | | | | | | | | | | | | |
| Total | 100 | 247 | — | — | 100 | 255 | 100 | 351 | 100 | 200 | 100 | 468/562 | — | — |
| Zinc | 1.15 | 2.80 | — | 36.4 | 13.5 | 34.4 | 3.86 | 13.55 | 1.3/2.6 | 2.6/5.2 | 5 | 23.4/28.1 | — | 49.4 |
| Fe | 3 | 7.41 | — | 47.7 | 12.5 | 31.9 | 15.9 | 56 | 13/26 | 26/52 | — | — | — | 70. |
| Pb | 24 | 59.3 | — | 56 | 25.5 | 65 | 19.7 | 69.3 | 25 | 50 | — | — | — | — |
| Ratio $\frac{Zn + Fe}{Pb}$ | 0.173 | | 1.50 | | 1.02 | | 1.00 | | 0.572/1.144 | | — | | — | |
| Dissolved Metals | | | | | | | | | | | | | | |
| Zinc | 98.3 | 161.2 | 82 | 165.6 | 83.6 | 175.6 | 93.3 | 188.5 | 98/99 | 257/255 | 84/87 | 157/152 | 85 | 199.6 |
| Fe | 97.5 | 291.7 | 85 | 270.3 | 89.9 | 283.1 | 80.4 | 230 | 80/90 | 234/208 | | | 85 | 400 |
| H$_2$SO$_4$ Feed: Kg | | | | | | | | | | | | | | |
| Fresh | | 1275 | | — | | — | | — | | 432/400 | | | | 703.4 |
| With Residue | | — | | — | | — | | — | | | | | | 16 |
| Electrolyte Return | | 1915 | | 973 | | 857.4 | | 1140 | | 1238/1148 | | | | 829.3 |
| Total | | 3190 | | 973 | | 857.4 | | 1140 | | 1670/1548 | | | | 1548.7 |
| Operating Parameters | | | | | | | | | | | | | | |
| Process Type | Discontinuous | | Discontinuous | | Discontinuous | | Discontinuous | | Discontinuous | | Discontinuous | | Discontinuous | |
| Starting Acidity | 300 g/l | | 140 g/l | | 133 g/l | | 136 g/l | | 250 g/l | | 100/120 g/l | | 330 g/l | |
| Final Acidity | 205 g/l | | 24.5 g/l | | 20 g/l | | 30 g/l | | 80/120 g/l | | 15/20→1 g/l | | 53 g/l | |
| Residence Time | 2 h | | 6 h | | 9–10 h | | 6 h | | 3 h | | 8–16 h | | 3 h | |
| Temperature | 95° C. | | 90° C. | | 90–95° C. | | 90–95° C. | | 90/106° C. | | 80–90° C. | | 75–85° C. | |
| Volume of Slurry | 10.63 m$^3$/T | | 6.6 m$^3$/T | | 6.45 m$^3$/T | | 8.63 m$^3$/T | | 6.5 m$^3$/T | | ? | | 4.7 m$^3$/T | |

I U.S. Pat. No. 3,434,798
II & III Canadian 787,853
IV Belgian 724,214
V Belgian 673,023
VI U.S. Pat. No. 1,834,960
VII U.S. Pat. No. 1,973,295

| | VARIOUS EXPERIMENTS | | | | | | | | | | | |
|---|---|---|---|---|---|---|---|---|---|---|---|---|
| | 1 | | 2 | | 3 | | 4 | | 5 | | 6 | |
| | % | kg | % | kg | % | kg | % | kg | % | kg | % | kg |
| Initial Residue | | | | | | | | | | | | |
| Total | 100 | 1,000 | 100 | 1,000 | 100 | 1,000 | 100 | 1,000 | 100 | 1,000 | 100 | 1,000 |
| Zinc | 25 | 250 | 26 | 260 | 22 | 220 | 30.5 | 305 | 30.5 | 305 | 30.5 | 305 |
| Fe | 28 | 280 | 27 | 270 | 28 | 280 | 28 | 280 | 28 | 280 | 28 | 280 |
| Pb | 5 | 50 | 5.2 | 52 | 5.1 | 51 | 5.2 | 52 | 5.2 | 52 | 5.2 | 52 |
| Final Residue | | | | | | | | | | | | |
| Total | 100 | 200 | 100 | 141,7 | 100 | 175.9 | 100 | 247.6 | 100 | 157.5 | 100 | 118 |
| Zinc | 3 | 6/2.7 | 3.82 | 2 | 3.51 | 3 | 7.43 | 3.2 | 5.04 | 0.8 | 0 | |
| Fe | 6 | 12 | 5.6 | 7.93 | 10.1 | 17.71 | 14 | 34.67 | 5.8 | 9.13 | 1.8 | 2.1 |
| Pb | 25 | 50 | 36.7 | 52 | 29 | 51 | 21 | 52 | 33 | 52 | 44 | 52 |
| Ratio $\frac{Zn + Fe}{Pb}$ | 0.36 | | 0.226 | | 0.417 | | 0.809 | | 0.272 | | 0.059 | |

-continued

| | VARIOUS EXPERIMENTS | | | | | | | | | | | |
|---|---|---|---|---|---|---|---|---|---|---|---|---|
| | 1 | | 2 | | 3 | | 4 | | 5 | | 6 | |
| | % | kg | % | kg | % | kg | % | kg | % | kg | % | kg |
| Dissolved Elements | | | | | | | | | | | | |
| Zinc | 97.6 | 244 | 98.53 | 256.18 | 98.0 | 216.24 | 97.6 | 297.6 | 98.3 | 300 | 99.69 | 304.05 |
| Fe | 95.7 | 268 | 97.06 | 262.07 | 99.66 | 262.24 | 87.6 | 245.3 | 96.7 | 270.8 | 99.25 | 277.9 |
| H$_2$SO$_4$ Fed (kg) | | | | | | | | | | | | |
| Fresh | | 240 | | 154 | | 140 | | 260 | | 1,340 | | 130 |
| Return Electrolyte | | 1,255 | | 1,370 | | 1,330 | | 990 | | 2,010 | | 1,440 |
| Total | | 1,496 | | 1,524 | | 1,470 | | 1,250 | | 3,350 | | 1,570 |
| Operating Parameters | | | | | | | | | | | | |
| Acidity: stage I (g/l) | | 50–40 | | 50–40 | | 50–40 | | 30–15 | | | | 50–40 |
| II (g/l) | | 180–150 | | 150–140 | | 150–140 | | 120–110 | | 300 → 200 | | 145–135 |
| III (g/l) | | — | | 300 → 200 | | 300 → 200 | | 250–240 | | | | 245–285 |
| Residence Time | | ~6 h. | | ~6 h. + 16 h. | | ~6 h. + 4 h. | | ~6 h. + 16 h. | | ~16 h. | | ~6 h. + 24 h. 25' |
| Temperature | | ~95° C. | | ~95° C. | | ~95° C. | | ~95° C. | | ~95° C. | | 95° C. |
| Slurry Volume | | | | | | | | | | | | |
| m$^3$/T Residue Treated | | | | | | | | | | | | |
| Stages I and II | | ~9.35 | | ~9.5 | | ~9.7 | | ~9.5 | | ~11.2 | | ~9 |
| III | | — | | ~1.0 | | ~1.0 | | ~1.2 | | | | ~0.85 |

1 2 Continuous Stages: 6 Hours
2 3 Stages: 2 Continuous for 6 Hours and a Final Discontinuous Stage: 300 → 200 g/l H$_2$SO$_4$ for 16 Hours
3 Same With a 4 Hour Final Stage
4 3 Continuous Stages With the First at Low Acidity
5 1 Stage Like French Pat. 1,447,094 Batchwise at 300 → 200 g/l H$_2$SO$_4$
6 3 Stages According to the Invention

TABLE 3

600 cm3 of Neutral Leaching Slurry With 413 g/l Solids and Variable Solution Volume With 152 g/l H$_2$SO$_4$ and 20 g/l of Iron

| | I + 3 l. of Solution | | | | II + 2.25 l. of Solution | | | | III + 1.5 l. of Solution | | | |
|---|---|---|---|---|---|---|---|---|---|---|---|---|
| | Time 0 | After 2 h. | 4 h. | 6 h. | Time 0 | 2 h. | 4 h. | 6 h. | Time 0 | 2 h. | 4 h. | 6 h. |
| Slurry | | | | | | | | | | | | |
| Solid Material g/l | 59 | 15.2 | 14.6 | 13 | 75 | 16.6 | 13.6 | 13 | 103 | 34.2 | 36 | 40 |
| SOLUTION | | | | | | | | | | | | |
| Acidity H$_2$SO$_4$ g/l | 132 | 70.5 | 68.6 | 66.6 | 126.7 | 49 | 37.2 | 37.2 | 116 | 21.6 | 19.6 | 16.7 |
| Iron Dissolved g/l | 17.4 | 30.4 | 35.5 | 35.5 | 16.6 | 33.5 | 36.6 | 38.4 | 15.4 | 37.1 | 35.6 | 27.3 |
| Solid Content | | | | | | | | | | | | |
| Analysis % | | | | | | | | | | | | |
| Zn | 30.5 | 13 | 8.7 | 7.2 | 30.5 | 13 | 9.7 | 7.3 | 30.5 | 15.9 | 13 | 7.7 |
| Fe | 28 | 11.4 | 6.1 | 6.2 | 28 | 17.5 | 11.7 | 10.3 | 28 | 25.1 | 26.5 | 27.1 |
| Pb | 5.2 | 22.6 | 27.8 | 29.1 | 5.2 | 23 | 27.2 | 28.8 | 5.2 | 15.1 | 14.1 | 11.6 |
| Weight grans | | | | | | | | | | | | |
| Zn | 63 | 6.18 | 3.37 | 2.66 | 63 | 6.08 | 3.84 | 2.72 | 63 | 11.32 | 9.91 | 7.13 |
| Fe | 57.8 | 5.43 | 2.40 | 2.29 | 57.8 | 8.18 | 4.62 | 3.84 | 57.8 | 17.87 | 20.20 | 25.11 |
| Pb | 10.75 | 10.75 | 10.75 | 10.75 | 10.75 | 10.75 | 10.75 | 10.75 | 10.75 | 10.75 | 10.75 | 10.75 |
| | Zinc and iron dissolved well without iron precipitation. But acidity was too high (see text). | | | | The limit for precipitation of iron becomes close. | | | | Precipitation of iron starts before 2 hours as the acidity goes below about 30 g/l H$_2$SO$_4$. The quantity of solids increases again and the Pb content decreases. The iron content of the solution decreases. | | | |

TABLE 4

A. Minimum Average By Ton of Treated Residue In Accordance With the Invention - an Industrial Scale Experiment

| | Primary Leaching (Neutral) | | Secondary Leaching (Acid) | | |
|---|---|---|---|---|---|
| | Roasted Ore | Residue | 1st Stage | 2nd Stage | 3rd Stage |
| Solids (Kg) | | | | | |
| Entering | 2,000 | | 1,000 | 500 | 250 |
| Residue | | 1,000 | 500 | 250 | 125 |
| Elements Dissolved | | | | | |
| Zinc | 1,200 | 250 | 114 | 17.5 | 1.25 |
| Fe | 200 | 200 | 93 | 37.5 | 2.5 |
| Pb | 50 | 50 | 50 | 50 | 50 |
| Silica (SiO$_2$) | 20 | 20 | 20 | 20 | 12 |
| Lime (CaO) | 8 | 8 | 8 | 8 | 4.8 |
| BaO | 5 | 5 | 5 | 5 | 5 |
| Silver | 0.2 | 0.2 | 0.2 | 0.2 | 0.2 |
| Contents | | | | | |
| Zinc % | 60 | 25 | 22.8 | 7 | 1 |
| Fe % | 10 | 20 | 18.6 | 15 | 2 |
| Pb % | 2.5 | 5 | 10 | 20 | 40 |
| Silica % | 1 | 2 | 4 | 8 | 9.6 |
| Lime % | 0.4 | 0.8 | 1.6 | 3.2 | 3.84 |
| BaO % | 0 25 | 0 5 | 1 | 2 | 4 |
| Silver g/T | 100 | 200 | 400 | 800 | 1,600 |

| Percentage Dissolved | Primary Leaching | Secondary Leaching Total | Secondary By Stage | | |
|---|---|---|---|---|---|
| | | | 1st | 2nd | 3rd |
| Zinc | 79.2 | 99.5 | 54.2 | 84.6 | 92.8 |
| Fe | 0 | 98.75 | 53.5 | 59.7 | 93.2 |
| Pb | 0 | 0 | 0 | 0 | 0 |

TABLE 4-continued

B. Typical Analysis by Ton of Residue Treated

| | Primary Leaching (Neutral) | | Secondary Leaching (Acid) | | |
| --- | --- | --- | --- | --- | --- |
| | Roasted Ore | Residue | 1st Stage | 2nd Stage | 3rd Stage |
| Solids (Kg) | | | | | |
| Entering | 2,240 | | | | |
| Residue | | 1,000 | 400 | 185 | 118 |
| Elements Contained: (in kg) | | | | | |
| Zinc | 1,300 | 305 | 84 | 11.1 | 0.95 |
| Fe | 280 | 280 | 92 | 25.9 | 2.1 |
| Pb | 52 | 52 | 52 | 52 | 52 |
| Silica (SiO$_2$) | 25 | 25 | 25 | 25 | 12.5 |
| Lime (CaO) | 9 | 9 | 9 | 9 | 4.5 |
| BaO | 4 | 4 | 4 | 4 | 4 |
| Silver | 0.25 | 0.25 | 0.25 | 0.25 | 0.25 |
| Contents: | | | | | |
| Zinc % | 58 | 30.5 | 21 | 6 | 0.8 |
| Fe % | 12.5 | 28 | 23 | 14 | 1.8 |
| Pb % | 2.67 | 5.2 | 13 | 28.1 | 44.06 |
| Silica % | 1.12 | 2.5 | 6.25 | 13.5 | 10.6 |
| Lime % | 0.4 | 0.9 | 2.25 | 4.86 | 3.8 |
| BaO % | 0.18 | 0.4 | 1 | 2.16 | 3.4 |
| Silver g/T | 111.6 | 250 | 625 | 1,350 | 2,118 |

| Percent Dissolved | Primary Leaching Only | Secondary Leaching Total | Secondary By Stage | | |
| --- | --- | --- | --- | --- | --- |
| | | | 1st | 2nd | 3rd |
| Zinc | 76.54 | 99.69 | 72.5 | 86.8 | 91.5 |
| Fe | 0 | 99.25 | 67.15 | 71.85 | 91.9 |
| Pb | 0 | 0 | 0 | 0 | 0 |
| Silica | 0 | 50 | 0 | 0 | 50 |
| Lime | 0 | 50 | 0 | 0 | 50 |
| BaO | 0 | 0 | 0 | 0 | 0 |
| Silver | 0 | 0 | 0 | 0 | 0 |

TABLE 5

A. Operation Parameters - Average - of Industrial Experimentation Per Ton of Residue Treated

| | Primary Leaching (Neutral) | Secondary Leaching (Acid) | | |
| --- | --- | --- | --- | --- |
| | | 1st Stage | 2nd Stage | 3rd Stage |
| At the Reactors: | | | | |
| Specific Volume m$^3$/T/ | — | 31.14 | 20.76 | 20.76 |
| Number of Reactors in Series | — | 3 | 2 | 2 |
| Volume of Slurries Treated m$^3$/T | — | 9.6 | 8 | 1.1 |
| Time of Residence | — | 3 h 15' | 2 h 36' | 18 h 30' |
| Acidity H$_2$SO$_4$ g/l | — | 45→35 | 140→130 | 240→230 |
| Solids Content g/l | — | About 50 | About 30 | About 115 |
| Temperature | — | 90° C. | 90° C. | 95° C. |
| Content of Liquid (g/l) | | | | |
| Zinc | — | 70-80 | 50-60 | 40-60 |
| Fe | — | 20-30 | 10-15 | 35-40 |
| At the Decanters | | | | |
| Volume of Slurry Thickened After Decantation m$^3$/T | 2.50 | 1.25 | 0.91 | — |
| Content of Solid (as Above) g/l | 400 | 400 | 275 | — |

B. Typical Parameters of Industrial Experimentation

| | Primary Leaching (Neutral) | Secondary Leaching (Acid) | | |
| --- | --- | --- | --- | --- |
| | | 1st Stage | 2nd Stage | 3rd Stage |
| To the Reactors: | | | | |
| Specific Volume m$^3$/T/h. | — | 31.14 | 20.76 | 20.76 |
| Number of Reactors in Series | — | 3 | 2 | 2 |
| Volume of Slurry Treated m$^3$/T | — | 9.5 | 7.9 | 0.85 |
| Residence Time | — | 3 h 17' | 2 h 38' | 24 h 25' |
| Acidity H$_2$SO$_4$ g/l | — | 50→40 | 145→135 | 245→235 |
| Solids Content g/l | — | About 45 | About 25 | About 140 |
| Temperature | — | 92° C. | 93° C. | 96° C. |
| Content of Liquid g/l | | | | |
| Zinc | — | 75-85 | 50-60 | 40-60 |
| Fe | — | 25-35 | 10-15 | 20-35 |
| To the Decanters | | | | |
| Volume of Thickened Slurry After Decantation m$^3$/T | 2.38 | 0.94 | 0.528 | — |
| Content of Solid g/l (After Decantation as Above) | 420 | 425 | 350 | — |

TABLE 6

| | Lead Analysis of the Final Residue | | | Purity Criteria | % Dissolved With Respect to Starting Material | |
| --- | --- | --- | --- | --- | --- | --- |
| | Zn % | Fe % | Pb % | $\frac{Zn + Fe}{Pb}$ | Zn % | Fe % |
| According to invention : Average | 1 | 2 | 40 | 0.075 | 99.5 | 98.7 |
| According to invention : Standard | 0.8 | 1.8 | 44 | 0.059 | 99.7 | 99.25 |
| Stages: | 3 | 6 | 25 | 0.36 | 97.6 | 95.7 |
| Stages With 1st at Low acidity: | 3 | 14 | 21 | 0.81 | 97.6 | 87.6 |
| Stages With Last According to Patent (1) | (4 h) 2 | 10.1 | 29 | 0.417 | 98.3 | 93.66 |
| 100→200 g/l H$_2$SO$_4$ | (16 h) 2.7 | 5.6 | 36.7 | 0.226 | 98.53 | 97.06 |
| Original Experiment of (1) on the Neutral residue: | 1.15 | 3 | 24 | 0.173 | 98.3 | 97.5 |
| Stage According to (1) - New Test Direct on Neutral residue: | 3.2 | 5.8 | 33 | 0.272 | 98.3 | 97.7 |
| Canadian Patent | — | — | — | 1.50 | 82 | 85 |

TABLE 6-continued

| | Lead Analysis of the Final Residue | | | Purity Criteria | % Dissolved With Respect to Starting Material | |
|---|---|---|---|---|---|---|
| | Zn % | Fe % | Pb % | $\frac{Zn + Fe}{Pb}$ | Zn % | Fe % |
| 787,853 | 13.5 | 12.5 | 25.5 | 1.02 | 83.6 | 89.9 |
| Belgian Pat. 724,214 | 3.86 | 15.9 | 19.7 | 1.00 | 93.3 | 80.4 |
| Belgian Pat. 673,023 | 1.3/2.6 | 13/26 | 25 | 0.572/1.144 | 98/99 | 80/90 |
| U.S. Pat. No. 1,834,960 | 5 | — | — | — | 84/87 | — |
| U.S. Pat. No. 1,973,295 | — | — | — | — | 85 | 85 |

Moreover, according to the invention - partial dissolution (up to 40-50%) of $SiO_2$ and CaO (1) French Patent 1,447,094

TABLE 7

For 1,000 Kg of Treated Residue
I. Attack of Decreasing Acidity (300 g/l→200 g/l $H_2SO_4$ for 6 Hours)

| | Starting Residue Content Weight | | After 2 Hours | | 4 Hours | | 6 Hours | |
|---|---|---|---|---|---|---|---|---|
| | | kg | Content | Weight | Content | Weight | Content | Weight |
| $H_2SO_4$ | 300 g/l | — | 231 g/l | — | 208 g/l | — | 200 g/l | — |
| Zn | 5.5% | 55 | 2.1% | 17 | 2% | 13.1 | 1.8% | 11 |
| Fe | 15.0% | 150 | 11.6% | 94.2 | 10.1% | 66.2 | 9.8% | 60 |
| Pb | 19.0% | 190 | 23.4% | 190.0 | 29% | 190.0 | 31.0% | 190 |

Attack at 95° C. Upon cooling, the mass gels at about 80° C.

II. Attack at Constant Average Acidity (250-255 g/l $H_2SO_4$)

| | Starting Residue Content Weight | | After 2 Hours | | 4 Hours | | 6 Hours | |
|---|---|---|---|---|---|---|---|---|
| | | kg | Content | Weight | Content | Weight | Content | Weight |
| $H_2SO_4$ | 250 g/l | — | 255 g/l | — | 254 g/l | — | 252 g/l | — |
| Zn | 5.5% | 55 | 2.7% | 19 | 1.9% | 11.6 | 1.3% | 7.2 |
| Fe | 15.0% | 150 | 13.4% | 94.3 | 8.7% | 53.0 | 5.5% | 30.0 |
| Pb | 19.0% | 190 | 27.0% | 190.0 | 31.2% | 190.0 | 34.5% | 190.0 |

The mass does not gel upon cooling.

We claim:

1. In a process for the treatment of ferriferrous residues from the primary leaching of oxidized zinc ores, wherein such a solid primary residue is subjected to successive secondary leaching stages with aqueous sulfuric acid treating solutions at temperatures in the range from about 85° C. to about 100° C., to produce a final lead-bearing residue and an acidic solution of zinc sulfate, which after purification to eliminate iron is suitable for recycling to said primary leaching operation, the improvement which comprises:
conducting said secondary leaching operation countercurrently in at least three successive stages,
the concentration of sulfuric acid in the treating solution employed being increased in each successive stage from a minimum concentration in the first stage, which is above the concentration at which jarosite precipitates, to a maximum concentration in the last stage, which is in large excess with respect to the amounts of soluble metals remaining in the residue of the next to last stage, but below the concentration which produces gelification of the reaction mixture on cooling,
said concentration of sulfuric acid in the treating solution of the last stage being within the range from about 200 to about 300 g/l of said treating solution, and being maintained within ±10 g/l of a concentration within said range for the duration of the last stage reaction, which is at least about 6 hours,
the residue from said last stage being the desired lead-bearing by-product.

2. The process of claim 1 which is conducted continuously.

3. The process of claim 2 wherein the concentration of sulfuric acid in the treating solutions, the volume of the treating solutions employed, and the duration of the reaction in each stage prior to said last stage, are so adjusted and maintained that at the end of the next to last stage, the residue thereof has been reduced to less than about 30% of said primary residue,
said reduced residue being fed into said last stage at a concentration of at least about 250 g/l.

4. The process of claim 3 wherein the silica content of the last stage reaction mixture is in the range from about 10 to about 40 g/l, the sulfuric acid concentration of the treating solution is in the range from about 300 to 250 g/l and the total solids content of the reaction mixture is in the range from about 175 to about 125 g/l,
the higher concentrations of acid and total solids content being employed with the lower concentrations of silica and the lower concentrations of silica and the lower concentrations of acid and total solids content being employed with the higher concentrations of silica.

5. The process of claim 3 wherein the concentrations of sulfuric acid, zinc, iron and solids in the last stage are adjusted by the addition to the last stage reaction mixture of a predetermined quantity of fresh concentrated sulfuric acid and an adjusted quantity of an acid solution containing from about 150 to about 200 g/l of $H_2SO_4$.

6. The process of claim 2 wherein the concentration of sulfuric acid in the treating solution of the last stage and the total solids content of the last stage reaction mixture are each selected with regard to the silica content of said reaction mixture, the lower the silic content the higher the acid and total solids content, and the higher the silica content the lower the concentration of acid and total solids, the volume of treating solution being adjusted to that the zinc and iron contents of said solution are less than about 70 g/l.

7. The process of claim 1 wherein the residue of each stage, except the last stage, is recycled to the next successive stage of the secondary leaching operation, and the acidic solutions produced in each stage are recycled to the next preceding stage, the acidic solution from the first stage being said acidic zinc sulfate solution which after purification to eliminate iron is suitable for recycling to said primary leaching operation.

8. The process of claim 1, 7, 2, 6 or 4 wherein the concentrations of sulfuric acid, zinc, iron and solids in the last stage are adjusted by the addition to the last stage reaction mixture of a predetermined quantity of fresh concentrated sulfuric acid and an adjusted quantity of an acidic solution containing from about 150 to about 200 g/l of $H_2SO_4$.

9. The process of claim 3 wherein the predetermined quantity of concentrated sulfuric acid introduced to the last stage is in the range from about 75 to about 150 Kg. per metric ton of zinc recoverable by the electrowinning of the acidic solution from said primary leaching operation from which the initial residue for said secondary leaching operation is derived.

10. The process of claim 9 wherein the predetermined quantity of concentrated sulfuric acid is in the range from about 80 to about 125 Kg per metric ton of zinc recoverable by such an electrowinning operation.

11. A continuous process for the recovery of a lead sulfate product of increased lead, gold and silver content and of reduced zinc and iron content from a hydrometallurgical zinc ore leaching-residue which process comprises, in a first stage,
(a) leaching said residue with sulfuric acid solution at a temperature in the range from about 85° to about 100° C., the acidity of the solution being above that which causes the precipitation of jarosite, thereby producing a first slurry
(b) concentrating said first slurry by removal of supernatant liquid and obtaining a first intermediate product and, in a second stage
(c) leaching said intermediate product with sulfuric acid solution, thereby producing a second slurry,
(d) concentrating said second slurry and obtaining a second intermediate product and, in a subsequent stage,
(e) leaching said second intermediate product for a time long enough and in the presence of a quantity of sulfuric acid solution sufficient to cause dissolution of enough silica from said second intermediate product and concentrations of sulfuric acid, iron, zinc and solids in the reaction mixture low enough to prevent gelification of the mixture, thus, producing a final slurry, the concentration of said sulfuric acid solutions being maintained substantially constant during each of the leaching stages,
(f) cooling and diluting said final slurry to permit easy separation of the lead sulfate product therefrom, and
(g) separating the desired lead sulfate product from said final slurry.

12. The process of claim 11 wherein the concentration of sulfuric acid in each of the leaching stages is maintained substantially constant by the countercurrent recycling of sulfuric acid, wherein the concentration of sulfuric acid in the first stage is maintained high enough to avoid precipitation of jarosite, the acidity and duration of reaction in the first and second stages are sufficient to dissolve at least about 70 percent of the solids content of the reaction mixture, and wherein sufficient sulfuric acid is introduced to the last stage to dissolve sufficient silica from the solid residue and to reduce the concentrations of iron and zinc to levels low enough to prevent gelification of the reaction mixture.

13. The process of claim 12 wherein the concentration of the sulfuric acid solutions in the said reaction stages is maintained substantially constant as a result of the steps which comprise
feeding to the leaching reaction in the first stage a sulfuric acid solution resulting from concentrating the slurry of the subsequent stage,
feeding to the leaching reaction in the second stage, a sulfuric acid solution comprising (a) sulfuric acid solution from the final separation of the lead sulfate product and (b) spent sulfuric acid from the electrolytic recovery of zinc from the zinc ores, and
feeding to the final leaching stage sulfuric acid comprising (c) spent sulfuric acid from the electrolytic recovery of zinc from zinc ores and (d) concentrated sulfuric acid.

14. The process of claim 13 wherein the feeding of the sulfuric acid solution to the leaching reaction in the first stage results from the concentration of the slurry after the second stage.

15. The process of claim 11 wherein the solid content of the slurry fed to the final treatment stage is not more than 30 percent of the solids content of the starting slurry.

16. The process of claim 15 wherein the said slurry fed to the final treatment contains at least 250 g/l of solids.

17. The process of claim 16 wherein the lead sulfate product which is isolated is of high purity as reflected by a ratio of Zn+Fe to Pb of not above about 0.1.

18. The process of claim 11 wherein the concentration of spent sulfuric acid used in the reactions is in the range of about 150 to 200 g/l.

19. The process of claim 18 wherein the final slurry is cooled by mixing with a sulfuric acid solution having a concentration in the range of about 150 to about 200 g/l.

20. The process of claim 19 wherein the volume of sulfuric acid solution fed is large enough to avoid gelification of the silica.

21. The process of claim 11 wherein the solids content of the products which are fed into the first and second stages is at least about 350 g/l.

22. The process of claim 21 wherein the lead sulfate product contains at least about 40 percent Pb.

23. The process of claim 11 wherein in the first and second stage at least about sixty percent of the total sulfuric-acid-soluble compounds are dissolved.

24. The process of claim 11 wherein in the first and second stage at least about sixty-five percent of the total sulfuric-acid-soluble compounds are dissolved.

25. The process of claim 11 which comprises regulating the feed of sulfuric acid to the final leaching stage so that the concentration of zinc, iron and of the solids does not exceed about 70 g/l, 70 g/l and 125–175 g/l, respectively.

26. The process of claim 11 which comprises cooling the final slurry.

27. The process of claim 26 wherein the slurry is cooled to below about 70° C.

28. The process of claim 11 which comprises after the leaching of the first stage, separating the liquid from the concentrated slurry and precipitating the iron thereof.

29. The process of claim 11 wherein the final leaching of said second intermediate product is for a period at least of about 6 hours.

30. The process of claim 29 wherein the period is of at least 10 hours.

31. The process of claim 11 which comprises maintaining the sulfuric acid concentration constant in the range of about 15 to about 50 g/l, in the first stage, about 130 to about 150 g/l in the second stage and in the subsequent and last stage from about 200 to 300 g/l.

32. The process of claim 11 wherein in the final reaction stage, the concentration of sulfuric acid is maintained to be constant within about ±10 g/l.

33. The process of claim 11 wherein in the final reaction stage the concentration of sulfuric acid is maintained within ±10 g/l of a concentration within the range from about 250 to about 300 g/l, said concentration depending upon the silica content in the slurry as follows:

250 g/l for about 30 g/l of silica and up to about 300 g/l for less than about 10 g/l of silica.

* * * * *